M. BRATT.
Churn.
No. 58,976.
Patented Oct. 23, 1866.
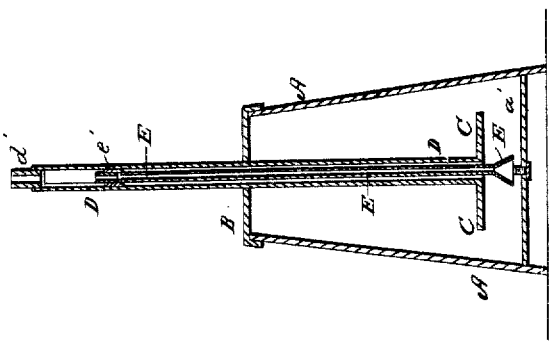
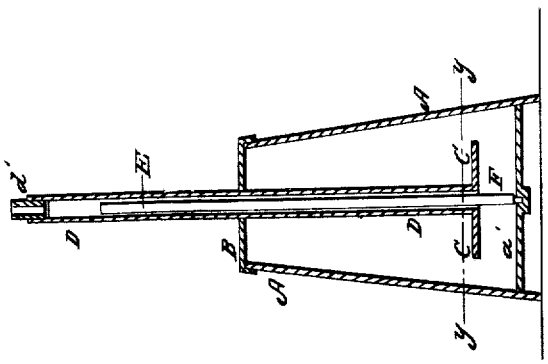
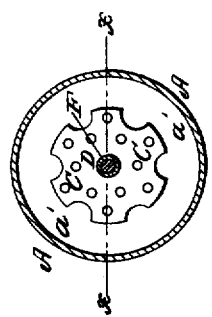
Witnesses:
F. A. Jackson
Wm. Truvin
Inventor:
M. Bratt
Per Munn & Co.
Attorneys.

UNITED STATES PATENT OFFICE.

M. BRATT, OF MAYSVILLE, KENTUCKY.

IMPROVEMENT IN CHURNS.

Specification forming part of Letters Patent No. 58,976, dated October 23, 1866.

*To all whom it may concern:*

Be it known that I, M. BRATT, of Maysville, in the county of Mason and State of Kentucky, have invented a new and useful Improvement in Churns; and I do hereby declare that the following is a full, clear, and exact description thereof, which will enable others skilled in the art to make and use the same, reference being had to the accompanying drawings, forming part of this specification, in which—

Figure 1 is a vertical section of a churn with my improvement attached, taken through the line $xx$, Fig. 3. Fig. 2 is the same view as Fig. 1, the interior tube of the dasher-handle being replaced with a solid rod. Fig. 3 is a horizontal cross-section of the same, taken through the line $yy$, Fig. 2.

Similar letters of reference indicate like parts.

My invention has for its object to furnish a churn so constructed and arranged that the air may be forced into the churn beneath the dasher to lessen the time required for the operation of churning and increase the yield of butter; and it consists in the combination of a hollow tube or equivalent, to force the air from the hollow handle into the milk, with the hollow handle and with the bottom of the churn.

A is the churn, B is the cover, and C is the dasher, about the construction of which parts there is nothing new. D is the dasher-handle, which is made hollow, as shown in Figs. 1, 2, and 3. $d'$ is a valve placed at the upper end of the hollow dasher-handle, as shown in Figs. 1 and 2. The valve $d'$ opens downward, and when the dasher is raised it opens and admits the air; but when the dasher is lowered it closes and prevents the air from escaping, which air is thus carried downward as the dasher descends.

E is a hollow tube, to the lower end of which is attached a screw, which screws into a socket formed in or attached to the center of the bottom $a'$ of the churn, as shown in Fig. 2. Through the lower end of the tube E is formed a number of holes, through which the air escapes into the milk near the bottom of the churn. The upper end of the tube E is enlarged, so as to fit the interior of the tube D.

$e'$ is a valve placed in the upper end of the tube E, opening downward, which, as the dasher D is lowered, opens and admits the air into the tube E, and when the dasher is raised the said valve $e'$ closes and prevents the escape of the air, which is thus forced out through the holes in the lower end of the said tube E into the milk. The interior tube, E, also serves as a guide to the dasher in its upward and downward movement.

If desired, the interior tube, E, may be replaced by a solid rod, F, upon the lower end of which is formed a screw, which screws into a socket formed in the bottom $a'$ of the churn, as before described. The rod F should not quite fill the cavity of the hollow dasher-handle D, and it acts as a plunger to force the air from the said cavity, the air being forced out immediately below the dasher C into the milk while said dasher is descending.

What I claim as new, and desire to secure by Letters Patent, is—

1. The combination of the hollow tube E, having a valve, $e'$, at its upper end, with the hollow dasher-handle D, having a valve, $d'$, at its upper end, and with the bottom $a'$ of the churn A, substantially as herein described, and for the purpose set forth.

2. The combination of the guide-rod or plunger F with the hollow dasher-handle D, having a valve, $d'$, at its upper end, and with the bottom $a'$ of the churn A, substantially as herein described, and for the purpose set forth.

MOSES BRATT.

Witnesses:
E. H. CLARK,
N. COOPER.